United States Patent
Ewert et al.

(10) Patent No.: US 9,184,978 B2
(45) Date of Patent: Nov. 10, 2015

(54) OPERATING AND SUPPORTING DUAL MODE USER EQUIPMENT

(75) Inventors: Joerg Christian Ewert, Erkelenz (DE); Ralf Keller, Würselen (DE); Andreas Witzel, Herzogenrath (DE); Martin Stumpert, Hochspeyer (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 705 days.

(21) Appl. No.: 11/576,138

(22) PCT Filed: Sep. 28, 2004

(86) PCT No.: PCT/EP2004/010861
§ 371 (c)(1),
(2), (4) Date: Mar. 27, 2007

(87) PCT Pub. No.: WO2006/034725
PCT Pub. Date: Apr. 6, 2006

(65) Prior Publication Data
US 2007/0207784 A1    Sep. 6, 2007

(51) Int. Cl.
*H04J 3/16* (2006.01)
*H04J 3/22* (2006.01)
*H04L 12/66* (2006.01)
(Continued)

(52) U.S. Cl.
CPC ...... *H04L 29/06027* (2013.01); *H04L 65/1006* (2013.01); *H04L 67/14* (2013.01); *H04W 8/20* (2013.01); *H04W 8/02* (2013.01);
(Continued)

(58) Field of Classification Search
CPC ............. H04L 29/08657; H04L 67/2823; H04L 12/5895; H04L 51/38; H04L 65/1006; H04L 67/303; H04L 67/306; H04L 67/30; H04L 29/06027; H04L 67/14; H04W 92/02; H04W 8/20; H04W 8/02; H04W 80/10; H04W 80/00; H04W 88/06
USPC .............. 370/352–356, 465–467; 455/435.1
See application file for complete search history.

(56) References Cited

U.S. PATENT DOCUMENTS 6,996,087 B2 * 2/2006 Ejzak ............................ 370/338
7,496,360 B2 * 2/2009 Sindhwani et al. ......... 455/422.1
(Continued)

FOREIGN PATENT DOCUMENTS

EP      1317108 A    6/2003

OTHER PUBLICATIONS

3rd Generation Partnership Project; Technical Specification Group Services and System Aspects; IP Multimedia Subsystem (IMS); Stage 2 (Release 5). 3GPP TS 23.228 v5.9.0. (Jun. 2003).

*Primary Examiner* — Hoang-Chuong Vu

(57) ABSTRACT

A call to a dual mode user equipment is handled by using a further access network from cellular telecommunications access network. An indication of an incoming call to the user equipment is received in a control node that the device can be reached via a device using session initiation protocol (SIP) via the cellular telecommunication access network. The device using SIP sends messages to a device that transforms messages sent according to call control signaling protocol used in the cellular telecommunications network into messages according to SIP. A route to the SIP device is linked to a device that transforms user plane according to protocol in the cellular telecommunications access network into user plane according to internet protocol and vice versa.

23 Claims, 6 Drawing Sheets

(51) Int. Cl.
*H04L 29/06* (2006.01)
*H04W 8/20* (2009.01)
*H04L 29/08* (2006.01)
*H04W 8/02* (2009.01)
*H04W 80/00* (2009.01)
*H04W 80/10* (2009.01)
*H04W 88/06* (2009.01)

(52) U.S. Cl.
CPC .............. *H04W 80/00* (2013.01); *H04W 80/10* (2013.01); *H04W 88/06* (2013.01)

(56) References Cited

U.S. PATENT DOCUMENTS

| | | | |
|---|---|---|---|
| 8,374,631 B2* | 2/2013 | Kall et al. | 455/456.2 |
| 2002/0110104 A1* | 8/2002 | Surdila et al. | 370/338 |
| 2002/0147008 A1* | 10/2002 | Kallio | 455/426 |
| 2002/0164984 A1* | 11/2002 | Thakker | 455/435 |
| 2002/0177440 A1* | 11/2002 | Mukherjee | 455/433 |
| 2003/0026245 A1 | 2/2003 | Ejzak | |
| 2003/0027595 A1* | 2/2003 | Ejzak | 455/560 |
| 2003/0133421 A1* | 7/2003 | Sundar et al. | 370/328 |
| 2003/0134636 A1* | 7/2003 | Sundar et al. | 455/432 |
| 2004/0005886 A1* | 1/2004 | Oda et al. | 455/422.1 |
| 2004/0072593 A1 | 4/2004 | Robbins et al. | |
| 2005/0047399 A1* | 3/2005 | Lee et al. | 370/352 |
| 2005/0058125 A1* | 3/2005 | Mutikainen et al. | 370/354 |
| 2006/0025140 A1* | 2/2006 | Bales et al. | 455/445 |
| 2006/0046714 A1* | 3/2006 | Kalavade | 455/428 |
| 2006/0052113 A1* | 3/2006 | Ophir et al. | 455/456.1 |
| 2006/0079236 A1* | 4/2006 | Del Pino et al. | 455/445 |
| 2006/0121894 A1* | 6/2006 | Ganesan | 455/432.1 |
| 2006/0121916 A1* | 6/2006 | Aborn et al. | 455/456.5 |
| 2007/0060124 A1* | 3/2007 | Kalavade | 455/433 |
| 2007/0291733 A1* | 12/2007 | Doran et al. | 370/352 |
| 2008/0058003 A1* | 3/2008 | Rydnell et al. | 455/552.1 |
| 2008/0261595 A1* | 10/2008 | Westman | 455/435.2 |
| 2009/0170519 A1* | 7/2009 | Wilhoite et al. | 455/436 |
| 2010/0091765 A1* | 4/2010 | Doshi et al. | 370/352 |
| 2010/0173620 A1* | 7/2010 | Hicks, III | 455/417 |

* cited by examiner

OPERATING AND SUPPORTING DUAL MODE USER EQUIPMENT

CLAIM OF PRIORITY

This application is a 371 of International Application No. PCT/EP04/10861, filed Sep. 28, 2004. The disclosure of this document is hereby incorporated herein by reference.

TECHNICAL FIELD

The present invention relates to methods and devices for enabling the access to a cellular telecommunications network via a further access network.

RELATED ART

In recent years the percentage of household having a broadband connection at home was increasing. Today 11% of the households in Germany are equipped with a broadband connection (mainly ADSL). In Sweden the percentage is already 22% (50% ADSL, 50% other technologies). It is expected that these percentages will increase significantly over the next years. Many of these users will install private WLAN (Wireless Local Area Network)-access points to connect their PCs (Personal Computers), PDA (Personal Digital Assistants), mobile phones etc. to their fixed broadband connection.

Furthermore, it is expected that the number of public WLAN-hot spots in Europe will increase from approx. 18.000 (2003) to 36.000 (2009).

Parallel, to the increased number of broadband connections the users are starting to use IP (Internet Protocol) telephony over their WLAN-broadband connection via PCs and PDAs. In the next years mobile phone vendors will launch so-called GSM/WLAN dual mode phones (e.g. Nokia 2005).

For these users of the GSM/WLAN dual mode phones it will be quite easy to originate calls via the SIP-client over the WLAN-radio interface towards other SIP-clients connected to the same network or even to the internet.

However, and unsolved matter is the reception of incoming calls at the dual mode devices.

Today several architectures are proposed how to integrate cellular networks with WLAN-access points. The main focus is the integration of the WLAN-access point towards the packet switching network.

For example Mobile @home proposes an architecture where the WLAN-access point is connected via a broadband connection to the BSC. The disadvantage of this solution is that the same operator has to supply the cellular mobile network and the broadband connection. Furthermore, Mobile @home proposes a solution based on the ADSL (Asymmetric Digital Subscriber Line) technology.

It is a shortcoming of the state of the art that solutions designed for speech connections lack flexibility.

Therefore it is object of the invention to provide methods and devices for enabling the access for speech connections to a cellular telecommunications network via a further access network with an improved flexibility.

SUMMARY

This will be solved advantageously by the methods of claims 1 and 11, the control node of claim 12 and the user equipment of claim 19. Further advantageous embodiments can be derived from the dependent claims.

One advantage of the invented method, control node and user equipment is that it requires modifications in the control node and the user equipment. Thus the invention can be implemented without major modifications of the existing networks.

The invention introduces a method for handling an incoming call to a user equipment by a control node of a cellular telecommunication network. Said method comprises the steps of receiving an indication of an incoming call to the user equipment in the control node, determining that the called user equipment can be reached via a device operating according to a session initiation protocol, initiating the linking in on a route towards the device operating according to a session initiation protocol, of a device that transforms messages sent according to a call control signalling protocol used in the cellular telecommunications network into messages according to the session initiation protocol and vice versa, and initiating the linking in on a route towards the device operating according to a session initiation protocol, of a device that transforms user plane transmitted according to a protocol used in the cellular telecommunications network into user plane transmitted according to an internet protocol and vice versa.

This enables the use of a further access network for transmitting payload at a terminating call. In most cases the further access network is cheaper for the transmission of data that the scarce radio resources of the 2G or 3G radio network.

In an embodiment of the invention, the method comprises the steps of receiving in the control node an indication that the user equipment can be reached via a device operating according to a session initiation protocol, determining an address of the device operating according to a session initiation protocol, and sending an indication that the user equipment can be reached via a device operating according to a session initiation protocol to a storage connected to the control node.

The method can further comprise the additional step of sending a message comprising an indication that the user equipment can be reached via a device operating according to a session initiation protocol is sent to a database for storing subscriber data.

The indication that the user equipment can be reached via a device operating according to a session initiation protocol can be received in a location area update message sent by the user equipment.

In a further embodiment of the invention, the step of determining comprises the steps of interrogating a database for storing subscriber data for routing information for reaching the called user equipment, receiving a response from said database and determining from analysing the response that the user equipment can be reached via a device operating according to a session initiation protocol.

The database can be an AAA server, a home location register or a home subscriber server.

The control node can be a mobile services switching centre, and the device that transforms messages sent according to a call control signalling protocol used in the cellular telecommunications network into messages according to the session initiation protocol and vice versa transforms messages can be a media gateway control function.

In an embodiment of the invention, the device that transforms user plane transmitted according to a protocol used in the cellular telecommunications network into user plane transmitted according to an internet protocol is a media gateway or is located in a media gateway.

The device operating according to a session initiation protocol can be for example a service initiation protocol proximity server or an interrogating call session control function.

The invention further introduces a method for operating a user equipment that comprises a first transmission unit for communicating with a cellular telecommunications access network and a second transmission unit for communicating with a further access network. The method comprises the steps of attaching to the cellular telecommunications network, determining that the user equipment is currently located in an area that is covered by the further access network, sending a session initiation protocol message for registering the user equipment at a server of the further access network, receiving a session initiation protocol message confirming that the user equipment has been registered, sending a message comprising an indication that the user equipment can be reached via a device operating according to the session initiation protocol to a control node of the cellular telecommunications network via the cellular telecommunications access network.

A control node for a cellular telecommunication network according to the invention comprises in input unit, an output unit, a control unit, wherein the control unit is adapted to determine that a user equipment can be reached via a device operating according to a session initiation protocol. The control unit is further adapted to initiate the linking in on a route towards the device operating according to a session initiation protocol, of a device that transforms messages sent according to a call control signalling protocol used in the cellular telecommunications network into messages according to the session initiation protocol and vice versa, and to initiate the linking in on a route towards the device operating according to a session initiation protocol, of a device that transforms user plane transmitted according to a protocol used in the cellular telecommunications network into user plane transmitted according to an internet protocol and vice versa.

In an embodiment of the invention, the control node is connected to a storage for storing subscriber data, and the input unit is adapted to receive an indication that a user equipment can be reached via a device operating according to a session initiation protocol and to signal it to the control unit, and that the control unit is adapted to initiate the sending of an indication that the user equipment can be reached via a device operating according to a session initiation protocol to the storage for storing subscriber data and to determine an address for sending data towards the user equipment.

In an embodiment of the invention the indication sent to the storage for string subscriber data comprises an address of the device operating according to a session initiation protocol.

The control node can be implemented by means of a mobile services switching centre or a mobile services switching centre server.

The storage can be a visitor location register.

In an embodiment of the invention, the control node is adapted to initiate the sending of a message to a database for storing subscriber data, wherein the message comprises an indication that the user equipment can be reached via a device that operates according to a session initiation protocol.

The control node can comprise a media gateway control function.

The invention further introduces a user equipment comprising a first transmission unit for communicating with a first access network of a telecommunications network, a second transmission unit for communicating with a further access network, and a control unit. The control unit is adapted to receive an indication from the second transmission unit that the user equipment is currently located in an area covered by the further access network, and in response thereto to initiate the registration of the user equipment at a server of the further access network via the second transmission unit, to receive a confirmation that the registration was successful via the second transmission unit, and to send an indication that the user equipment can be reached via a device operating according to a session initiation protocol to the telecommunications network via the first transmission unit.

In an embodiment of the invention the user equipment comprises a first transmission unit that is adapted to operate according to at least one of a Global System for Mobile Telecommunication, Code Division Multiple Access, Wideband Code Division Multiple Access, American Mobile Phone System, Digital-American Mobile Phone System, or Pacific Digital Cellular standards.

The user equipment can further comprise a second transmission unit that is adapted to operate according to at least one of Bluetooth, ISDN, or Wireless Local Area Network recommendations.

BRIEF DESCRIPTION OF THE DRAWINGS

The following figures show:

FIG. 1a depicts a registration of a dual mode user equipment with a SIP proxy, (state of the art) and the indicating of this to the telecommunications network

DETAILED DESCRIPTION

In the following the invention will be further described by means of examples and by means of figures.

It should be noted that the WLAN access is just an exemplary embodiment and could be replaced by any other access technology as for example Bluetooth, optical connection or fixed line connection. In particular access technology with lower costs on transmission resources like bandwidth than the GSM or WCDMA technology can be used advantageously for the further access.

It should be further noted that for an implementation of the invented methods, the access point adapted to communicate over a radio, fixed or optical connection to user equipment, may be connected by any means to a domain operating according to a session initiation protocol and transmitting data according to an internet protocol.

Figure 1:
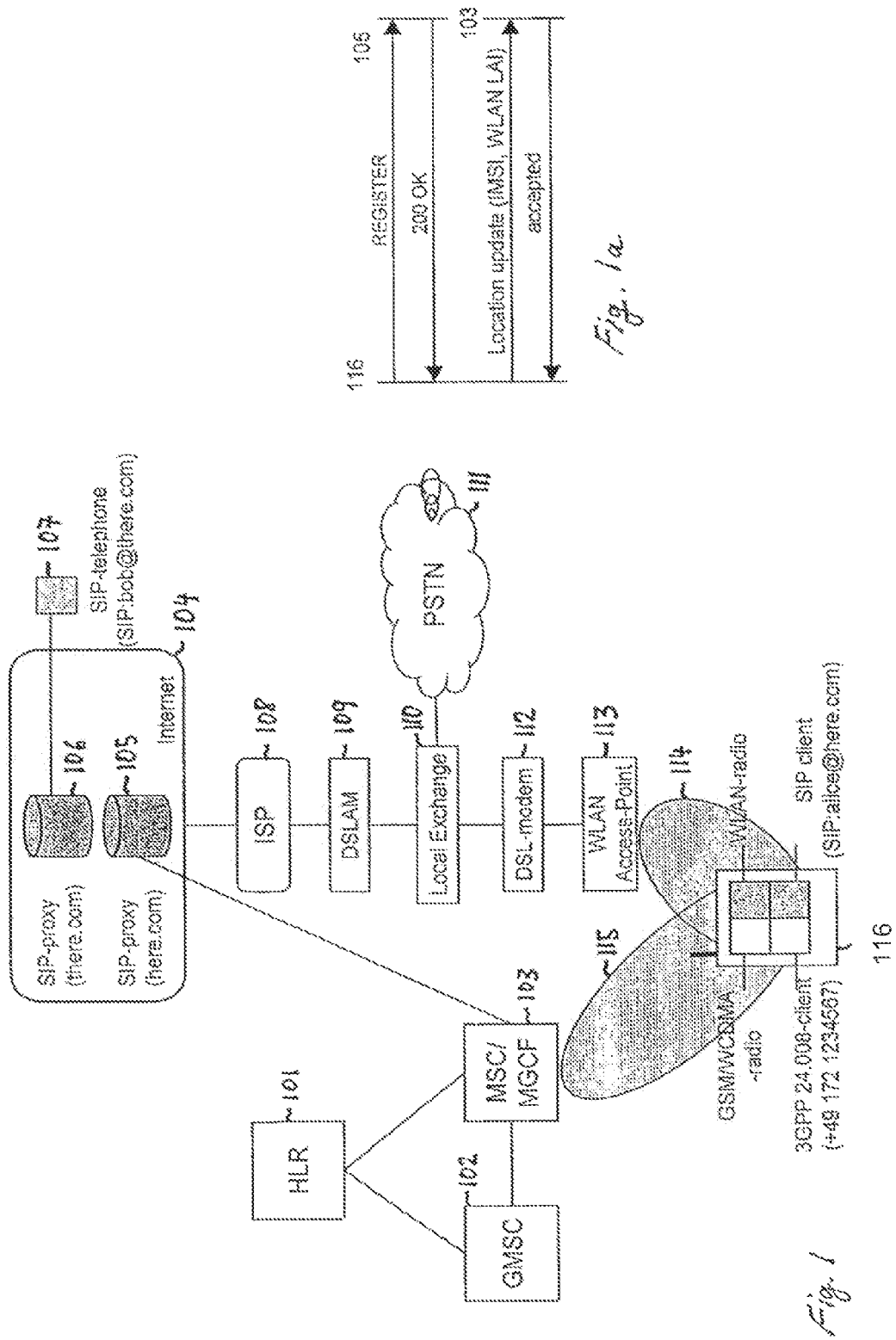
FIG. 1 depicts an architecture for enabling a user equipment to access a telecommunications network via a further access network.

FIG. 1 depicts an architecture for enabling a user equipment to access a telecommunications network via a further access network, comprising an home location register 101, a gateway mobile services switching centre, a combined mobile services switching centre/media gateway control function 103 which are connected to each other. In another embodiment of the invention the mobile services switching centre and the media gateway control function are not combined but just interconnected. The combined mobile services switching centre/media gateway control function 103 is further connected to an internet domain 104 comprising a first SIP (Session Initiation Protocol) proxy (proximity server) 105 and a second SIP proxy 106 that is connected to telephone 107 adapted to send signals according to SIP. The internet domain is connected via an ISP (Internet Service Provider)

108 and a DSLAM (Digital Subscriber Line Access Multiplexer) 109 to a local exchange 110 which is connected to a public switched telephony network 111. The local exchange is further connected via a DSL (Digital Subscriber Line) modem 112 to a WLAN-access Point 113.

A user equipment 116 is connected via a WLAN radio connection to the WLAN Access Point and via a GSM or WCDMA radio connection to the mobile services switching centre/media gateway control function.

According to the invention, the user equipment 116 can use the WLAN radio connection to register in the first SIP proxy 105. The details of the registration will be explained in FIG. 1a. FIG. 1a depicts a registration of the mode user equipment 116 with the first SIP proxy 105. This is state of the art. To that end the user equipment 116 sends a SIP register message towards the SIP proxy 105 via the WLAN radio connection. After successful registration the SIP proxy returns a 200 OK message to the user equipment. After receiving this confirmation that the registration has been successful the user equipment sends an indication that it can be reached via the SIP proxy to the mobile services switching centre via the GSM or WCDMA connection by sending a location update message. The mobile services switching centre stores the indication in a visitor location register. It returns an accepted message to indicate the reception of the location update.

The sending of the indication can be implemented in several ways. It can be sent for example in a USSD (Unstructured Supplementary Service Data) message or any other signalling means between user equipment and mobile services switching centre. In the preferred embodiment it is included in a location update message. Independent from the means used for transporting the information from user equipment to mobile services switching centre, the information can be sent as a simple indication, for example a flag, indicating that an alternative access technology is available. In that case one can always use the same predefined device for routing calls from the mobile services switching centre/media gateway control function to the user equipment. Such device can be for example an interrogating call session control function as defined in the 3GPP recommendation 29.163 version 6.2.0 of March 2004. If not always the same device is used a device must be identified.

In a preferred embodiment of the invention the SIP proxy is identified by an identification of the user equipment. To that end, an identification of the user equipment, e.g. the MSISDN or the IMSI, is stored in a table or a database in association with an identification of the SIP proxy, conveniently this can be the address of the SIP proxy. In a further embodiment of the invention, the user equipment identification can be related to an operator and the operator identification can be stored in relation to the SIP proxy identification.

Alternatively, a device can be identified for example by determining location information of the user equipment like a location area or geographical coordinates and using a mapping table that maps said location information to an address. A further way to address the user equipment is the use of an ENUM (tElephone NUmber Mapping) database as defined in IETF (Internet Engineering Task Force) RFC 3761. The ENUM database maps the telephone number, for example the IMSI (International Mobile Subscriber Identity) of the user equipment, to an IP address. A further way is the transmission of a location area identifier in the location update message. The location area identifier carries an identification of the SIP proxy or of an access point, for example an ESSID (Extended Services Set IDentification), a domain name or a WLAN location area identification.

Figure 2:
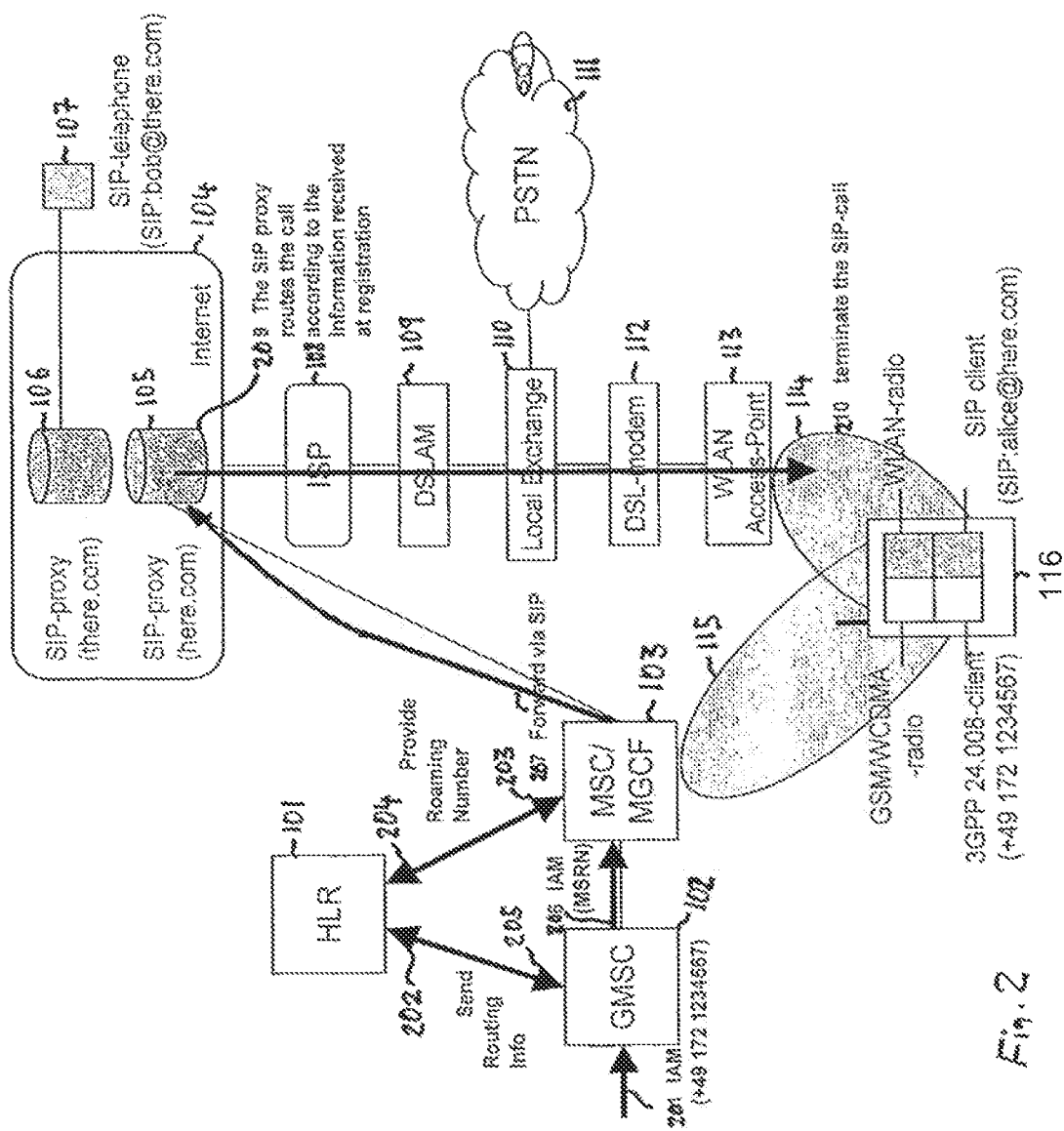
FIG. 2 depicts signal flow for an incoming call according to the invention.

FIG. 2 depicts signal flow for an incoming call according to the invention. The architecture of FIG. 1 is used for receiving an incoming call at the user equipment 116 via the further access network, the WLAN access point 113.

In a first step 201 a call request message, here an IAM (Initial address Message) is received at a control node, the gateway mobile services switching centre 102. The gateway mobile services switching centre analyses the received data and requests routing info from a database for storing subscriber data by sending a send routing info message 202 to the home location register 101. The home location register analyses the request and sends a request for an address of the called user equipment to a control node by sending a provide roaming number message 203 to the mobile services switching centre 103. The mobile services switching centre responds with a provide roaming number message 204 comprising a roaming number of the called user equipment. The home location register provides routing information to the gateway mobile services switching centre which uses this information to forward the call request message 206 to the mobile services switching centre.

The call control node mobile services switching centre receives the indication of an incoming call the IAM 206 and determines from that the call is directed to a user equipment that can be reached via a device operating according to a SIP protocol. It determines that the call can be routed via the SIP proxy 105 and links in the media gateway control function for transforming the ISUP signalling into SIP signalling. Not depicted is the linking of the media gateway for transforming payload transmitted according to a transfer mode used in the cellular core network to payload transmitted according to an IP.

In a next step 207 the control node mobile services switching centre 103 forwards the signalling via the media gateway control function as SIP signalling to the device operating according to a SIP, the SIP proxy 105. The SIP proxy 105 analyses the received information from the mobile services switching centre. By using the information received when registering the user equipment it initiates that the call is routed to the user equipment in a next step 209. The user equipment terminates the call in a step 210, via the farther access network, implemented as the WLAN radio connection from the WLAN access point.

Figure 3:
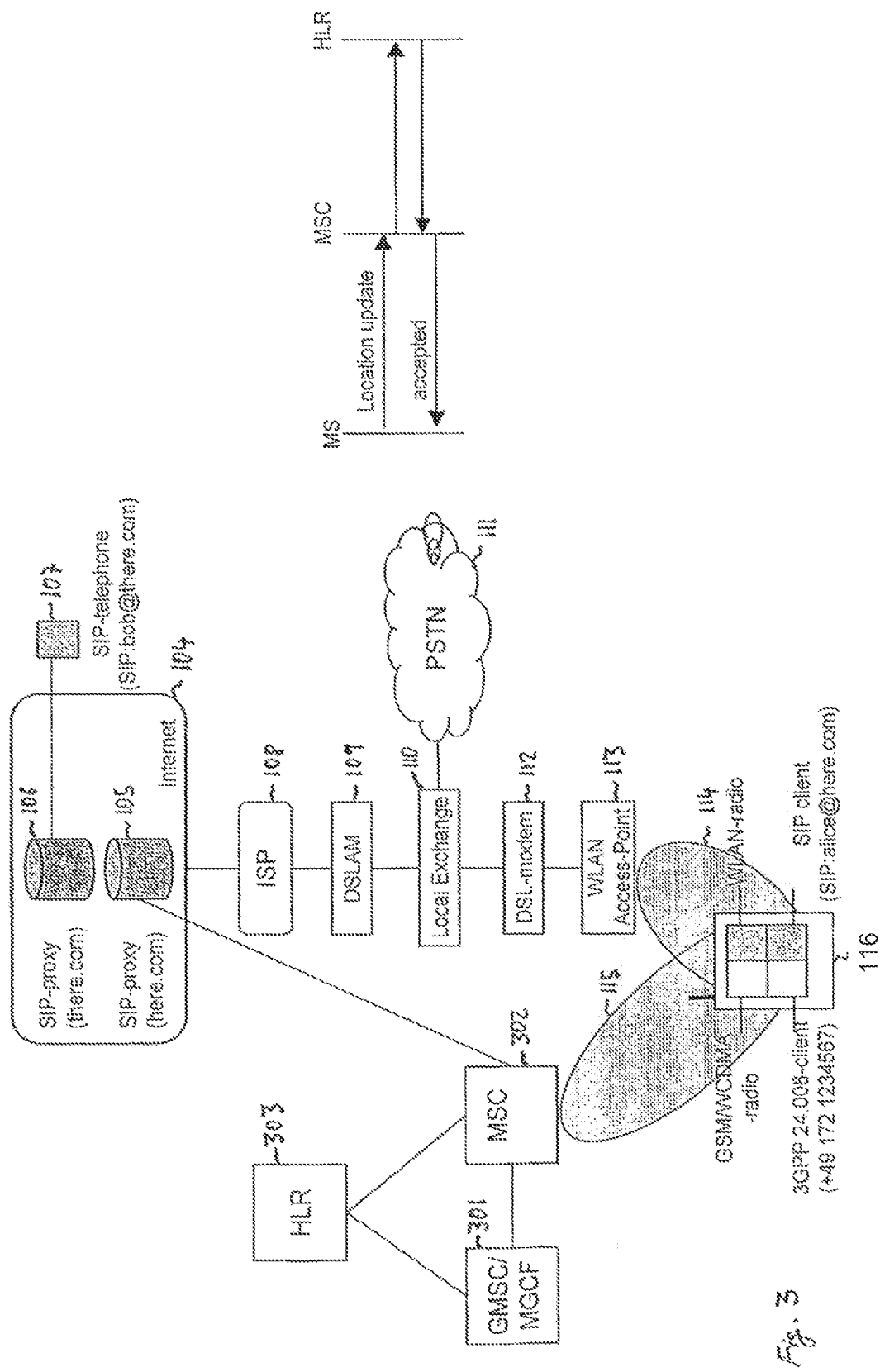
FIG. 3 depicts an alternative architecture for enabling a user equipment to access a telecommunications network via a further access network.

FIG. 3 depicts an alternative architecture for enabling a user equipment 116 to access a telecommunications network via a farther access network. The architecture comprises a control node implemented as a gateway mobile services switching centre 301. The gateway mobile services switching centre is collocated with a device that transforms messages sent according to a call control signalling protocol used in the cellular telecommunications network into messages according to the session initiation protocol and vice versa, in the example a media gateway control function. This collocation is optional, for the invention it is sufficient if they are connected to each other. The gateway mobile services switching centre/media gateway control function is connected to database for storing subscriber data, implemented as a home location register 303. The gateway mobile services switching centre/media gateway control function 301 is further connected to a control node 302 which is a mobile services switching centre. The home location register and mobile services switching centre are also connected to each other. The mobile services switching centre 302 is further connected to an internet domain 104 in particular to a device operating according to a session initiation protocol, implemented as a SIP proxy 105 known from FIG. 1. Apart from the home location register 303, the mobile services switching centre 302 and the gateway mobile services switching centre/media gateway control function 301, the architecture is similar to the architecture of FIG. 1. Also similar are the actions of the user equipment 116 that registers itself with a server of the further access network, that is with the SIP server 105 and sends an indication that it can be reached via a device operating according to a SIP, that is again SIP server 105, to the control node 302 of the cellular telecommunications network. However, the mobile services switching centre will perform one additional step compared to the architecture of FIG. 1, it sends an indication that the user equipment 116 can be reached via a device operating according to a SIP to the home location register 303. The home location register stores said indication related to the user equipment 116 or related to the subscriber or user of the user equipment 116. In a preferred embodiment of the invention, the indication comprises an address of the device operating according to a SIP.

Figure 4:
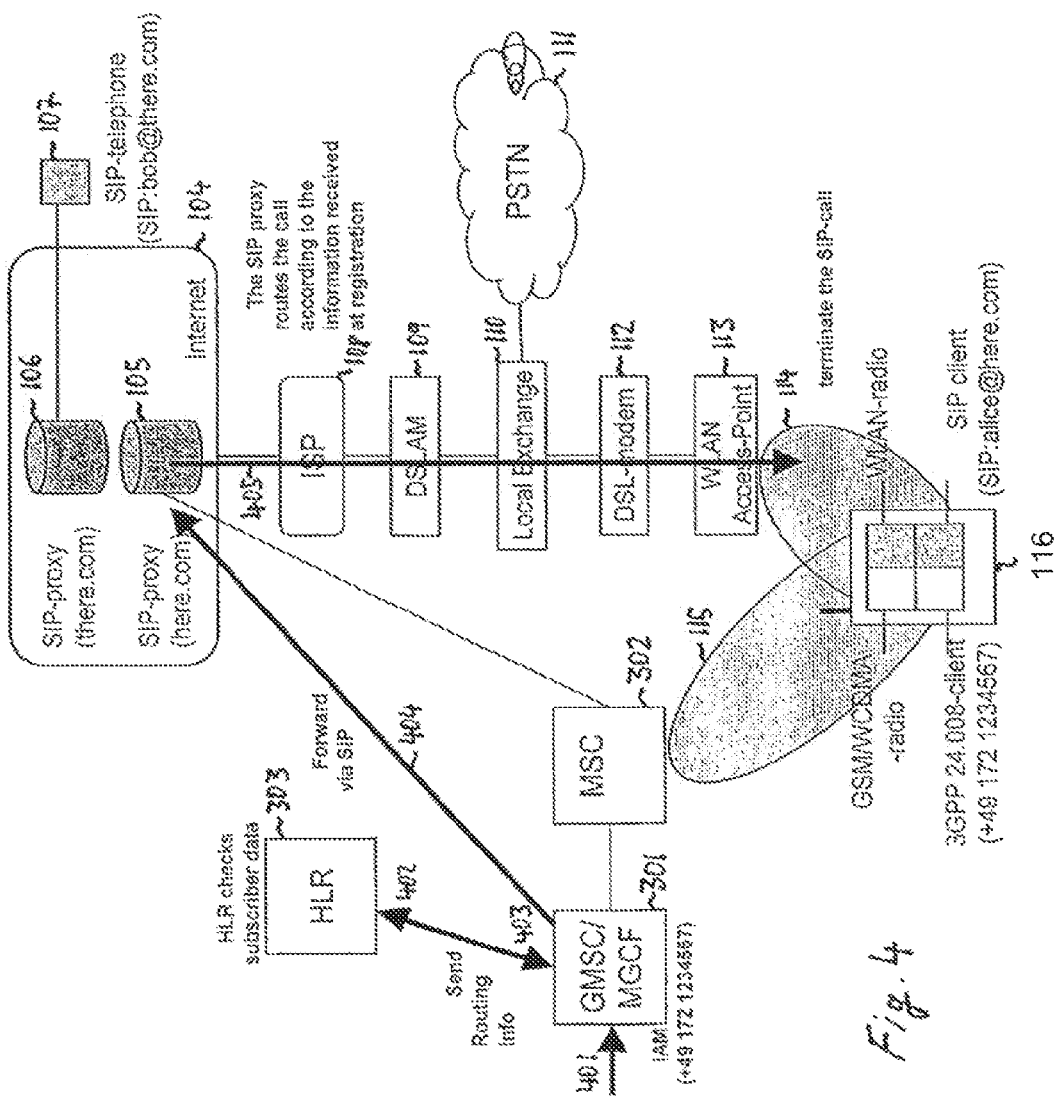
FIG. 4 depicts an alternative signal flow for an incoming call according to the invention.

FIG. 4 depicts an alternative signal flow for an incoming call according to the invention, in the architecture of FIG. 3. In a first step 401 the gateway mobile services switching centre/media gateway control function 301 receives an indication of an incoming call to the user equipment 116 by means of an IAM. It analyses the IAM and requests routing information of the home location register 303 by sending a send routing info message in a step 402. The home location register analyses the message and checks the appropriate subscriber data. Said data comprise an indication that the user equipment 116 can be reached via device operating according to a SIP. The home location register returns an address of the device or information that enables the determination of the device in a send routing info message in a step 403.

The gateway mobile services switching centre determines that the called user equipment can be reached via a device operating according to a session initiation protocol. It initiates the linking in on a route towards the device operating according to a session initiation protocol, i.e. the SIP server, of a device that transforms messages sent according to a call control signalling protocol used in the cellular telecommunications network into messages according to the session initiation protocol and vice versa, i.e. the gateway mobile services switching centre.

The gateway mobile services switching centre further initiates the linking in on a route towards the device operating according to a session initiation protocol, of a device that transforms user plane transmitted according to a protocol used in the cellular telecommunications network into user plane transmitted according to an internet protocol and vice versa, which is a media gateway or a device connected to or comprised in a media gateway.

After initiating the linking in at least on the signaling path, the gateway mobile services switching forwards the call request to the SIP proxy in a step 404, the further steps are the same as described by means of FIG. 2, i.e., the SIP proxy 105 analyses the received information from the mobile services switching center. By using the information received when registering the user equipment it initiates that the call is routed to the user equipment in a next step 405.

Figure 5:
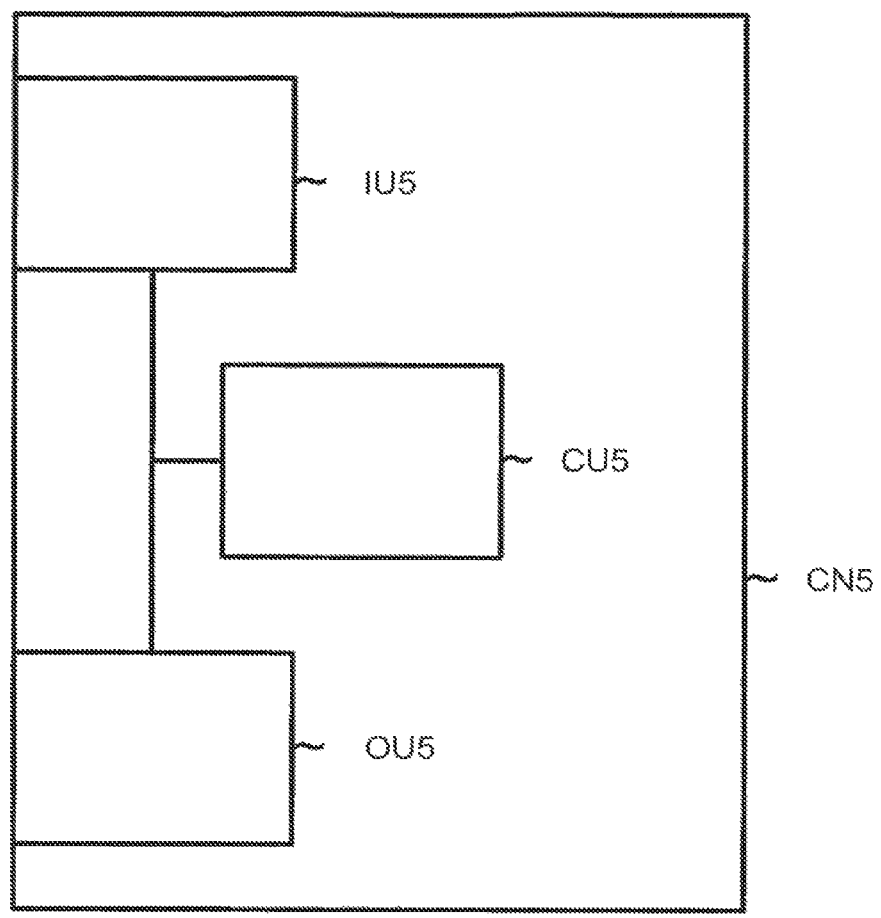
FIG. 5 depicts a control node according to the invention.

FIG. 5 depicts a control node CN5 according to the invention, comprising an input unit IU5, an output unit OU5, and a control unit CU5.

The control node can be operating for example as a mobile services switching centre or a gateway mobile services switching centre.

Figure 6:
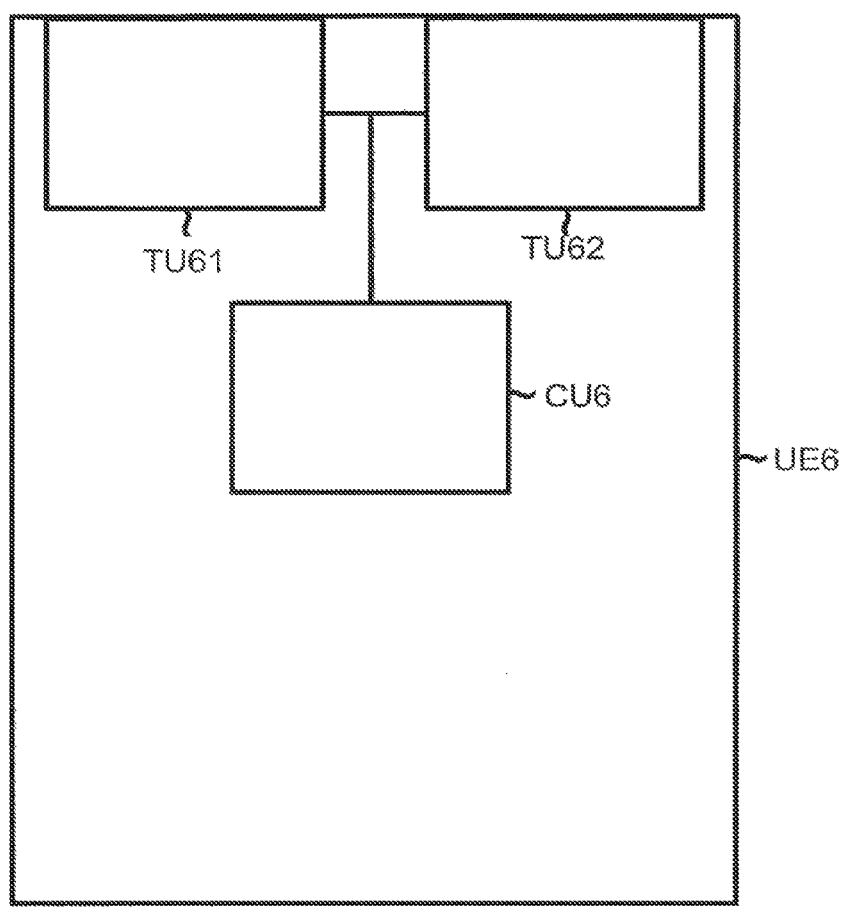
FIG. 6 depicts a user equipment according to the invention.

FIG. 6 depicts a user equipment UE6 according to the invention, comprising a first transmission unit TU61 for communicating with a first access network of a telecommunications network, a second transmission unit TU62 for communicating with a further access network, and a control unit CU6. The user equipment first attaches to a first cellular telecommunications access network like a so-called 2G or 3G network via the first transmission unit TU61. When the user equipment enters a coverage area for the second transmission unit TU62, the second transmission unit sends an indication to the control unit indicating that.

The control unit receives an indication from the second transmission unit that the user equipment is currently located in an area covered by the further access network, and in response thereto to initiate the registration of the user equipment at a server of the further access network via the second transmission unit.

After successful registration the second transmission unit receives a confirmation that the registration was successful and forwards it to the control unit. The control unit sends an indication that the user equipment can be reached via a device operating according to a session initiation protocol to the telecommunications network via the first transmission unit.

The invention claimed is:

1. A method for handling an incoming call to a user equipment by a control node of a cellular telecommunication access network, said method comprising the following steps:

receiving in the control node an indication of an incoming call to the user equipment, wherein the user equipment is connected to the cellular telecommunication access network, receiving in the control node an indication communicated wirelessly by the user equipment to the cellular telecommunication access network, wherein the indication indicates that the user equipment is connected by a further access network to a device operating according to a session initiation protocol, and wherein the cellular telecommunication access network rather than the further access network initially receives the indication of the incoming call to the user equipment, initiating in the control node the linking in on a route towards the device operating according to a session initiation protocol, of a device that transforms messages sent according to a call control signaling protocol used in the cellular telecommunications access network into messages according to the session initiation protocol, initiating in the control node the linking in on a route towards the device operating according to a session initiation protocol, of a device that transforms user plane transmitted according to a protocol used in the cellular telecommunications access network into user plane transmitted according to an internet protocol and vice versa; and wherein the control node by performing the first initiating step and the second initiating step provides the incoming call to the user equipment using the device operating according to the session initiation protocol rather than using a wireless radio connection.

2. The method according to claim 1, wherein after the second receiving step comprising the steps of:

determining an address of the device operating according to the session initiation protocol, and sending an indication, that the user equipment can be reached via the device operating according to a session initiation protocol, to a storage connected to the control node.

3. The method according to claim 1 further comprising the step of
sending a message comprising an indication that the user equipment can be reached via the device operating according to a session initiation protocol to a database for storing subscriber data.

4. The method according to claim 3, wherein the database is an AAA server, a home location register or a home subscriber server.

5. The method according to claim 1, wherein the indication that the user equipment can be reached via the device operating according to a session initiation protocol, is received in a location area update message sent by the user equipment.

6. The method according to claim 1, wherein the step of determining comprises the steps of
interrogating a database for storing subscriber data for routing information for reaching the called user equipment,
receiving a response from said database and
determining from analyzing the response that the user equipment can be reached via the device operating according to a session initiation protocol.

7. The method according to claim 1 wherein the control node is a mobile services switching center.

8. The method according to claim 1 wherein the device that transforms messages sent according to a call control signaling protocol used in the cellular telecommunications access network into messages according to the session initiation protocol transforms messages is a media gateway control function.

9. The method according to claim 1, wherein the device that transforms user plane transmitted according to a protocol used in the cellular telecommunications access network into user plane transmitted according to an internet protocol is a media gateway or is located in a media gateway.

10. The method according to claim 1 wherein the device operating according to a session initiation protocol is a service initiation protocol proximity server or an interrogating call session control function.

11. The method according to claim 1, wherein the indication of the incoming call to the user equipment is an initial address message.

12. A method for operating a user equipment that comprises a first transmission unit for communicating with a cellular telecommunications access network and a second transmission unit for communicating with a further access network the method comprising the steps of:
attaching to the cellular telecommunications access network,
determining that the user equipment is currently located in an area that is covered by the further access network,
sending a session initiation protocol message for registering the user equipment at a server of the further access network,
receiving a session initiation protocol message confirming that the user equipment has been registered, and
sending a message from the user equipment to a control node within the cellular telecommunications access network, the message comprising an indication that the user equipment is connected by the further access network to a device operating according to the session initiation protocol, wherein the user equipment is configured to receive an incoming call from the device operating according to the session initiation protocol rather than receive the incoming call over a wireless radio connection directly from the cellular telecommunications access network which initially received the incoming call.

13. A control node for a cellular telecommunication access network comprising:
an input unit,
an output unit, and
a control unit, the control unit adapted:
to receive an indication of an incoming call to a user equipment, wherein the user equipment is connected to the cellular telecommunication access network,
to determine, based on an indication communicated wirelessly by the user equipment to the cellular telecommunication access network, that the user equipment is connected by a further access network to a device operating according to a session initiation protocol, and wherein the cellular telecommunication access network rather than the further access network initially receives the indication of the incoming call to the user equipment,
to initiate the linking in on a route towards the device operating according to a session initiation protocol, of a device that transforms messages sent according to a call control signaling protocol used in the cellular telecommunications access network into messages according to the session initiation protocol and vice versa,
to initiate the linking in on a route towards the device operating according to a session initiation protocol, of a device that transforms user plane transmitted according to a protocol used in the cellular telecommunications access network into user plane transmitted according to an internet protocol and vice versa; and
wherein the control node by performing the first initiate operation and the second initiate operation provides the incoming call to the user equipment using the device operating according to the session initiation protocol rather than using a wireless radio connection.

14. The control node according to claim 13, wherein the control node is connected to a storage for storing subscriber data, wherein the input unit is adapted to receive an indication that a user equipment can be reached via the device operating according to a session initiation protocol and to signal it to the control unit, and
the control unit is adapted to initiate the sending of an indication that the user equipment can be reached via the device operating according to a session initiation protocol to the storage for storing subscriber data and to determine an address for sending data towards the user equipment.

15. The control node according to claim 14, wherein the storage is a visitor location register.

16. The control node according to claim 14, wherein the indication sent to the storage for storing subscriber data comprises an address of the device operating according to a session initiation protocol.

17. The control node according to claim 13, that is implemented by means of a mobile services switching center or a gateway mobile services switching center server.

18. The control node according to claim 13, wherein the control node is adapted to initiate the sending of a message to a database for storing subscriber data, the message comprising an indication that the user equipment can be reached via a device that operates according to a session initiation protocol.

19. The control node according to claim 13, wherein the control node comprises a media gateway control function.

20. The control node according to claim 13, wherein the indication of the incoming call to the user equipment is an initial address message.

21. A user equipment comprising:
- a first transmission unit for communicating with a first access network of a telecommunications access network, wherein the first transmission unit is connected to the first access network,
- a second transmission unit for communicating with a further access network, and
- a control unit, wherein the control unit is adapted:
  - to receive an indication from the second transmission unit that the user equipment is currently located in an area covered by the further access network, and in response thereto:
  - to initiate the registration of the user equipment at a server of the further access network via the second transmission unit,
  - to receive a confirmation that the registration was successful via the second transmission unit, wherein the second transmission unit is connected to the further access network, and
  - to send an indication wirelessly to the first access network, the indication indicating that the user equipment can be reached via a device operating according to a session initiation protocol which is connected to the further access network, wherein the user equipment is configured to receive an incoming call from the device operating according to the session initiation protocol rather than receive the incoming call over a wireless radio connection directly from the first access network which initially received the incoming call.

22. The user equipment according to claim 21, wherein the first transmission unit is adapted to operate according to at least one of a Global System for Mobile Telecommunication, Code Division Multiple Access, Wideband Code Division Multiple Access, American Mobile Phone System, Digital-American Mobile Phone System, or Pacific Digital Cellular standards.

23. User equipment according to claim 21 wherein the second transmission unit is adapted to operate according to at least one of Bluetooth, ISDN, or Wireless Local Area Network recommendations.

* * * * *